(12) United States Patent
Rattunde (10) Patent No.: US 7,918,034 B2
(45) Date of Patent: Apr. 5, 2011

(54) MEASURING RAM

(76) Inventor: Ulrich Rattunde, Bentwisch (DE)

( * ) Notice: Subject to any disclaimer, the term of this patent is extended or adjusted under 35 U.S.C. 154(b) by 0 days.

(21) Appl. No.: 12/528,013

(22) PCT Filed: Feb. 6, 2008

(86) PCT No.: PCT/DE2008/000205
§ 371 (c)(1),
(2), (4) Date: Apr. 8, 2010

(87) PCT Pub. No.: WO2008/101464
PCT Pub. Date: Aug. 28, 2008

(65) Prior Publication Data
US 2010/0192396 A1    Aug. 5, 2010

(30) Foreign Application Priority Data
Feb. 21, 2007   (DE) .................. 10 2007 008 887

(51) Int. Cl.
*G01B 1/00* (2006.01)
*G01B 5/14* (2006.01)

(52) U.S. Cl. .......................................... 33/529; 33/811

(58) Field of Classification Search ............ 33/529, 33/549, 551, 811, 613, 645
See application file for complete search history.

(56) References Cited

U.S. PATENT DOCUMENTS

| | | | |
|---|---|---|---|
| 3,975,829 A | | 8/1976 | Possati |
| 4,882,104 A | * | 11/1989 | Dobrowsky .................. 264/40.1 |
| 6,286,223 B1 | * | 9/2001 | Iwamoto ...................... 33/555.1 |
| 7,086,169 B1 | * | 8/2006 | Bayham et al. ................. 33/550 |
| 7,325,326 B1 | * | 2/2008 | Istre et al. ........................ 33/645 |

FOREIGN PATENT DOCUMENTS

| | | |
|---|---|---|
| DE | 92 03 582.5 | 6/1992 |
| DE | 10 2006 025506 A1 | 12/2007 |

* cited by examiner

*Primary Examiner* — Yaritza Guadalupe-McCall
(74) *Attorney, Agent, or Firm* — Varnum LLP (57) ABSTRACT

The invention relates to a measuring device for measuring the length of elongated profiles (100, 101, 102, 103) disposed in a longitudinal direction, particularly of pipes, between at least two opposing measuring sides (2, 3), of which at least one can be displaced on a measuring side (2, 3) in the longitudinal direction (L) until both ends (110, 111, 112, 113; 120, 121, 122, 123) of the elongated profile (100, 101, 102, 103) come in contact with each other, and at least one of the measuring sides (2, 3) has at least one measuring ram (10, 11, 12, 13), comprising at least two ribs (51a, 51b, 52a, 52b) that extend at a distance to each other transversely to the longitudinal direction (L) and can be displaced elastically back and forth in the longitudinal direction (L).

9 Claims, 6 Drawing Sheets

MEASURING RAM

CROSS REFERENCE TO RELATED APPLICATIONS

This is a National Phase application based on International Application Serial No. PCT/DE2008/000205 filed Feb. 6, 2008, which claims benefit of priority of German Patent Application No. 10 2007 008 887.8 filed Feb. 21, 2007.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention relates to a measuring device for measuring the length of elongate profiles arranged in a longitudinal direction, in particular pipes, between at least two measuring legs located opposite one another.

2. Background Art

Measuring devices for measuring the length of pipes have long been known in the prior art.

In DE 430 82 83 C2, a measuring device is described which makes it possible to measure the length or other dimensional criteria of a pipe. In said document, measuring inserts are arranged in an exchangeable manner on the device.

In U.S. Pat. No. 3,975,829, a measuring device is described which makes it possible to check the dimensioning of a workpiece. In said document, a measuring head is provided which can be returned via a spring and which is hydraulically damped.

The disadvantages of the above-described measuring devices are the multiple-component structure and the associated wear phenomena and also more frequent maintenance work.

BRIEF SUMMARY OF THE INVENTION

The object of the present invention is therefore to provide a measuring device of the type mentioned in the introduction which is composed of a relatively small number of components.

This object is achieved by a measuring device of the type mentioned in the introduction which has the features of the main claim.

To this end, the measuring device according to the invention comprises two spaced-apart measuring legs, at least one of which is displaceable.

Preferably, the displaceable measuring leg is connected to a distance meter which makes it possible to determine roughly the distance between the two measuring legs.

In order to determine precisely, i.e. to an accuracy of 0.4 µm, the length of an elongate profile, in particular a hollow or solid metal profile, it is provided a according to the invention to provide memory rams in at least one of the measuring legs. Preferably, all of the measuring rams are arranged in one of the two measuring legs, most advantageously in the displaceable measuring leg, so that the measuring electronics can be accommodated at one location.

The measuring device also allows the simultaneous, highly precise measurement of a plurality of profiles, and to this end a number of measuring rams corresponding to the plurality of profiles is provided. Preferably, the displaceable measuring leg comprises two, three or four measuring rams.

Each of the measuring rams is preferably formed in one piece and collaborates with a measuring sensor assigned thereto. The measuring ram has in each case one contact tongue, two webs and one movable and one positionally fixed spacer section. One positionally fixed section can be assigned to a plurality of, in particular two, adjacent measuring rams.

As a result of pressure being exerted by one end of a profile on one of the contact tongues, the latter is pushed into the measuring leg somewhat, in particular by less than 1 mm. The pushing-in of the contact tongue results in the deformation of two webs which are both arranged essentially parallel to the contact tongue and which are likewise connected in one piece with the contact tongue via the respective movable spacer section.

A first end of the two webs is integrally connected to the positionally fixed spacer section, and a second end of the two webs is integrally connected to the movable spacer section.

The arrangement according to the invention corresponds kinematically to that of a four-joint transmission. Correspondingly, a respective articulation would be arranged at the four transition points where the webs meet the spacer sections.

By contrast, the embodiment as a one-piece integral component according to the invention is particularly low on wear, maintenance-free and can be produced with high precision by means of the wire erosion process. The measuring ram is preferably made from steel.

Deformations of parts of the measuring ram can be determined by means of a measuring sensor, in particular a distance measurement sensor. Preferably, the sensor region of the measuring sensor is oriented towards the first web, which is spaced apart from the contact tongue only by a first gap. During the measurement, the measuring sensor determines the distance between itself and the web surface facing towards it. Such measurements can be carried out with a precision of 0.4 µm and more by means of inductive measuring sensors.

Most advantageously, the contact tongue is also connected in one piece with the movable spacer section, and the pressure force exerted thereon during the length measurement is transformed into a longitudinal movement, in particular of the movable spacer section. A movement perpendicular to the longitudinal direction or a rotational movement of the contact tongue does not take place or does not take place to a measurable extent.

Most advantageously, for each measuring ram, a first web is spaced apart from the contact tongue via a narrow gap and a second web is spaced apart from the first web by a clearance. In this case, the first web is provided between the contact tongue and the second web.

Most advantageously, each of the measuring sensors is connected to the measuring leg in a positionally fixed manner and is passed through said measuring leg through an opening in the respective second web. The sensor surface is arranged essentially free in the clearance between the first and second web. The sensor is oriented towards a surface of the first web remote from the contact tongue. The inductive measuring systems that are preferably used allow highly precise measurements only when the sensor region is essentially free. This means that no components of the measuring ram should be arranged even at the side of the sensor region. This prerequisite for a highly precise measurement is ensured according to the invention by the fact that the sensor head is provided in the clearance between the two webs.

In order to determine the overall length of one or more pipe sections, the displaceable measuring leg is connected to a distance meter for measuring the displacement travel, and the distance meter and the at least one measuring sensor are connected to a data processing unit, by means of which the profile length can be determined numerically from the measured data supplied thereto.

In one particularly advantageous arrangement of the measuring rams, the latter are provided in two rows next to one another and vertically offset from one another on the displaceable measuring leg. This arrangement of the measuring rams is particularly suitable in conjunction with a holder for the pipe sections that are to be measured simultaneously which is essentially funnel-shaped in cross-section perpendicular to the longitudinal direction of the profiles.

So that a variable number of profiles can be measured, the measuring sensors are in each case connected to a switch, by means of which they can be switched on and off individually. As a result, it is also possible to measure simultaneously two, three or just one profile using a measuring device originally designed for example for four profiles to be measured simultaneously.

BRIEF DESCRIPTION OF THE VIEW OF THE DRAWINGS

The invention will be described with reference to an example of embodiment in six figures. In the figures.

DETAILED DESCRIPTION OF THE INVENTION

Figure 1:
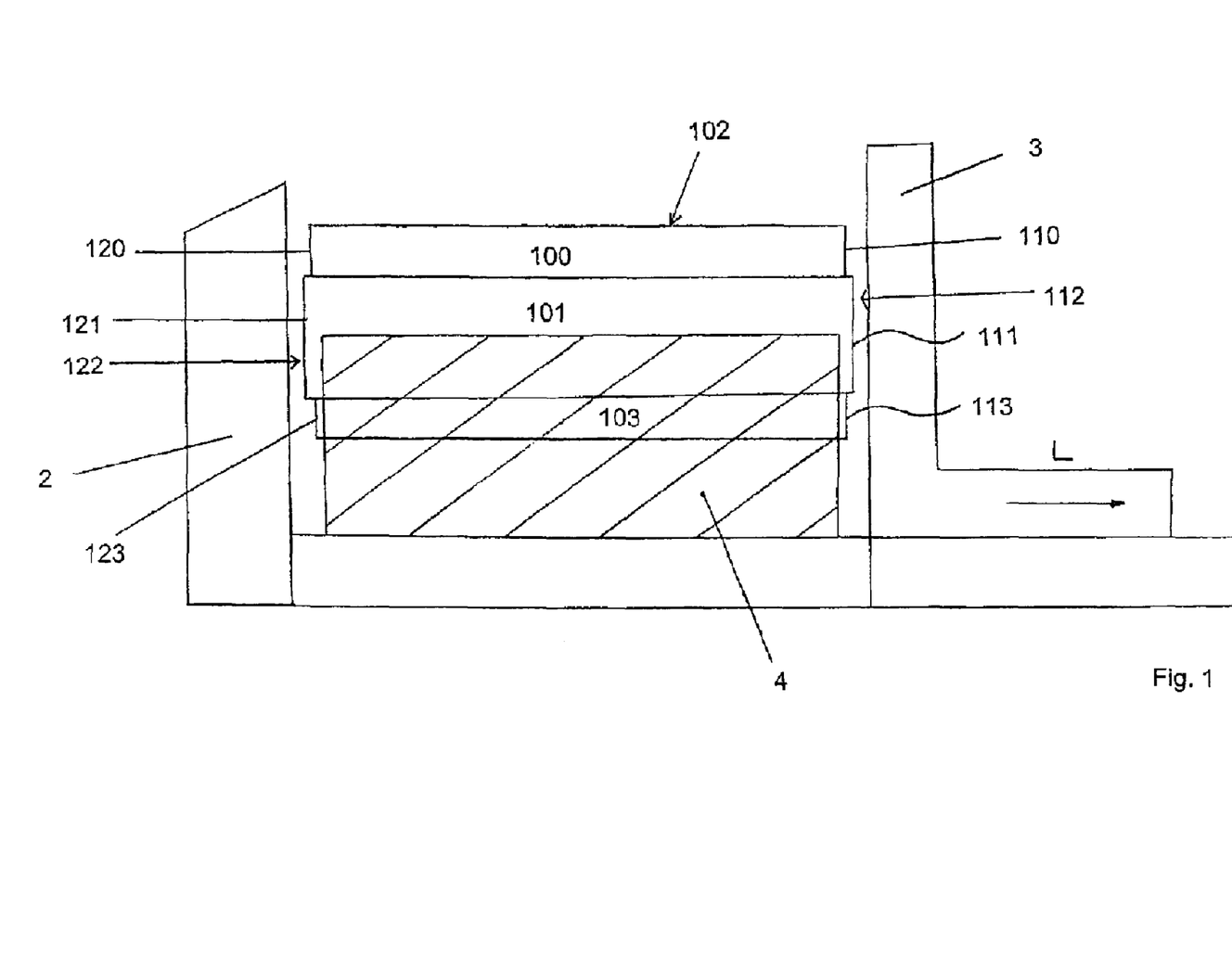
FIG. 1 shows a side view of a measuring device according to the invention.

FIG. 1 shows the basic arrangement of the measuring device for precisely determining the length of elongate, cylindrical profiles, in particular pipe sections 100, 101, 102, 103, but also solid profile sections. The measuring device is suitable in particular for use in combination with a pipe cutting or pipe sawing machine (not shown) arranged upstream thereof.

Modern pipe cutting machines make it possible to cut pipe sections 1 of a pipe with short cycle times. Less than one second may be necessary for a complete cutting process. During one operating cycle, the pipe is pushed into the sawing machine, cut, and the cut pipe section 1 is removed. The pipe sections 100, 101, 102, 103 that have been cut to size must be produced with extremely high precision. A length predefined by the customer may be allowed to vary for example by no more than 1 µm in order or the pipe section 100, 101, 102, 103 to remain usable.

The measuring device according to the invention allows the simultaneous length measurement or checking of a plurality of, in particular one, two, three or four, cut pipe sections 100, 101, 102, 103 simultaneously and with the predefined precision mentioned above.

The measuring device comprises a positionally fixed measuring leg 2 and a reaction L. The pipe sections 100, 101, 102, 103 are mounted on a holder 4 between the two measuring legs 2, 3 for checking the length. The holder 4 is shaped in such a way that the four pipe sections 100, 101, 102, 103 shown in FIG. 1 automatically come to rest for each measurement in the same position relative to the two measuring legs 2, 3 after they have been placed in the holder 4. The four pipe sections 100, 101, 102, 103 are in this case arranged parallel to one another in the longitudinal direction. Once the four pipe sections 100, 101, 102, 103 have been positioned in a stable manner and at rest in the holder 4 between the two measuring legs 2, 3, the displaceable measuring leg 3 is displaced towards the pipe section 100, 101, 102, 103 until in each case the two pipe ends 110, 111, 112, 113; 120, 121, 122, 123 of the four pipe sections 100, 101, 102, 103 come into contact with a respective one of the two measuring legs 2, 3. During the contact, the length measurement is carried out. The displaceable measuring leg 3 is then moved away from the positionally fixed measuring leg 2 in the longitudinal direction of the pipe sections 100, 101, 102, 103, and the four pipe sections 100, 101, 102, 103 are removed for delivery or further processing, in particular of the pipe section ends 110, 111, 112, 113; 120, 121, 122, 123.

In order to determine the length of each individual pipe section 100, 101, 102, 103, the measuring leg 3 which can be displaced in the longitudinal direction L has four measuring rams 10, 11, 12, 13 which measure individually. The measuring rams 10, 11, 12, 13 are shown in a perspective plan view in FIG. 2.

Figure 2:
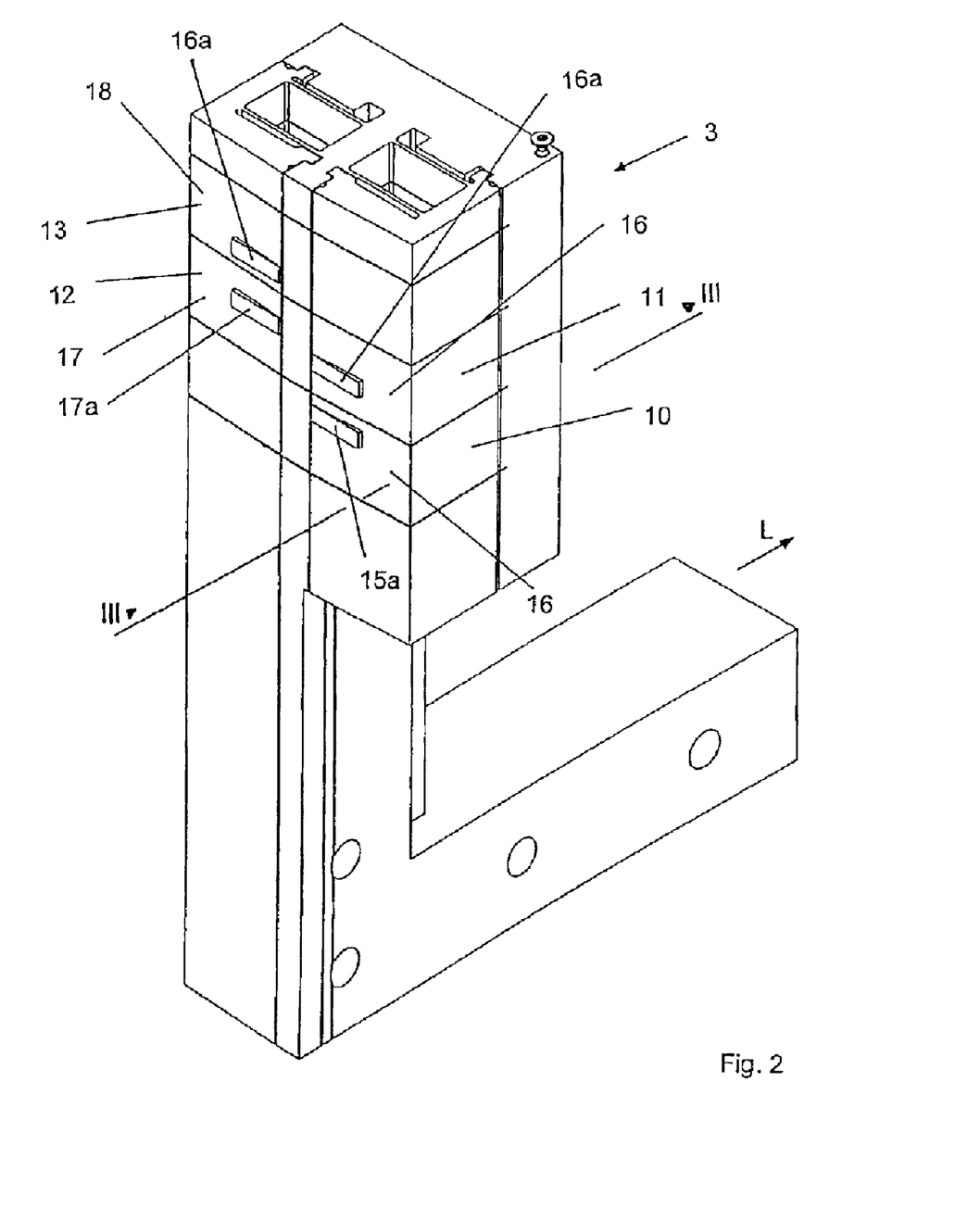
FIG. 2 shows a perspective view of a displaceable measuring leg of the measuring device of FIG. 1.

The measuring leg 3 is essentially L-shaped, wherein the lower, shorter leg of the L is provided such that it can be driven in a guide of the measuring device, whereas the long leg of the L protruding upwards next to the holder 4 comprises the four individual measuring rams 10, 11, 12, 13. The four measuring rams 10, 11, 12, 13 are arranged as two pairs which are located opposite one another and are offset vertically from one another by the spacing of the two measuring rams 10, 11 and 12, 13.

FIG. 2 shows a contact tongue 15, 16, 17, 18 of each measuring ram 10, 11, 12, 13, wherein each contact tongue 15, 16, 17, 18 has a bearing surface 15a, 16a, 17a, 18a facing towards the holder 4. The bearing surfaces 15a, 16a, 17a, 18a are in each case arranged parallel to a surface formed by an associated pipe section end 6, while the contact tongues 15, 16, 17, 18 are arranged at a slightly inclined angle relative to the holder 4. During the length measurement of the four pipe sections 100, 101, 102, 103, one pipe section end 110, 111, 112, 113 butts against just one respective bearing surface 15a, 16a, 17a, 18a of one of the contact tongues 15, 16, 17, 18. The contact tongues 15, 16, 17, 18 are elastically movable relative to the measuring leg 3.

Figure 3:
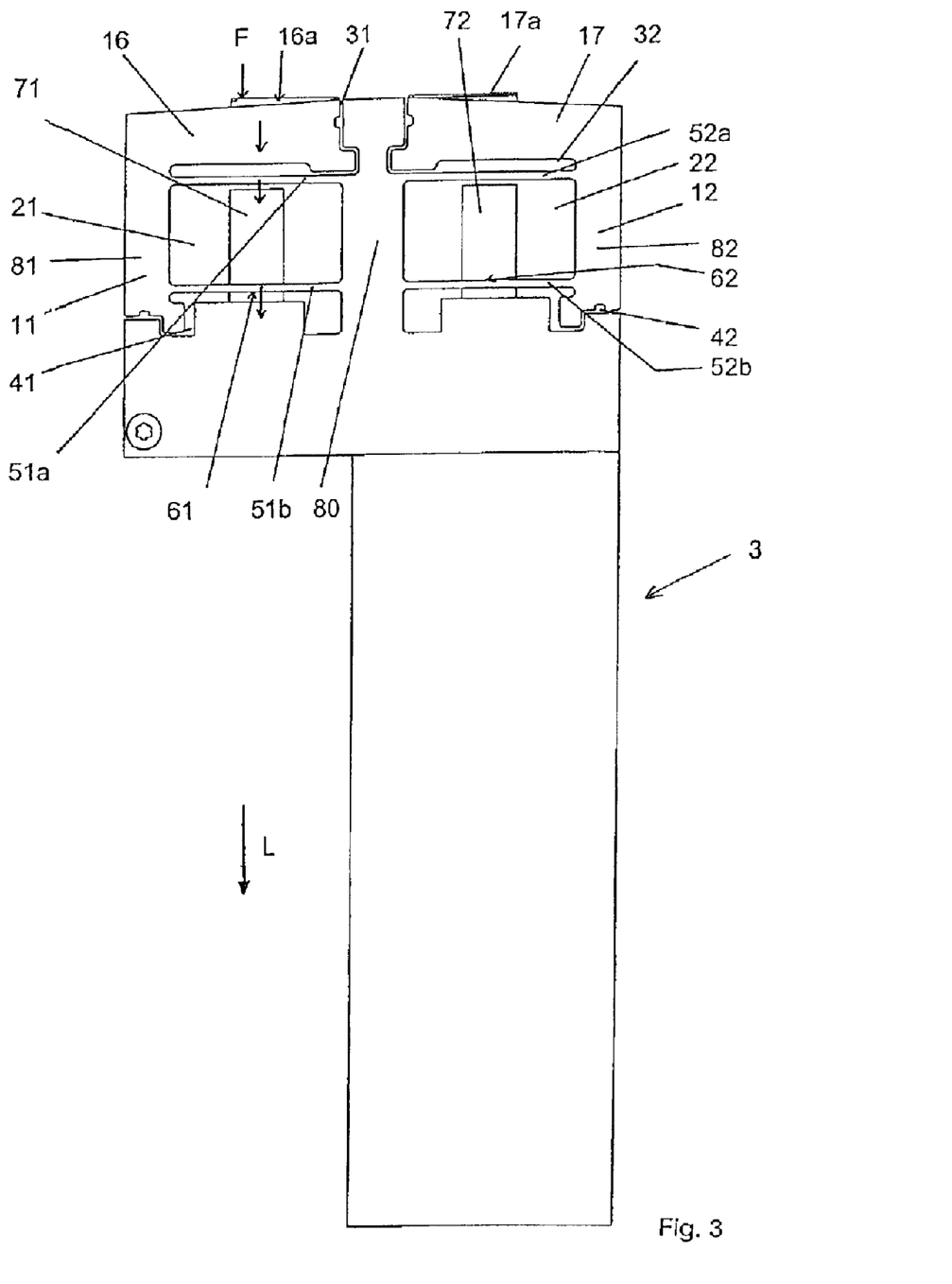
FIG. 3 shows a cross-sectional view and a plan view along the plane III-III in FIG. 2.

The cross-sectional view along the plane III-III shown in FIG. 3 with a plan view of the displaceable measuring leg 3 gives an insight into the interior of the long leg of the L. Here, it is possible to see in each case one of the bearing surfaces of the two left-hand bearing surface pairs 17a, 18a and of the two right-hand bearing surface pairs 15a, 16a, since the two are in each case arranged precisely one above the other. FIG. 3 shows the two measuring rams 11, 12 arranged next to one another. The two clearances 21, 22 assigned in each case to a measuring ram 11, 12 and the two gaps 31, 41, 32, 42 assigned in each case to a measuring ram 11, 12, as can be seen in FIG. 3, in each case pass completely through the long leg of the L.

A comparison with FIG. 2 shows that the left-hand gaps and the left-hand clearance shown in FIG. 3 are only approximately half as long as the two right-hand gaps and the right-hand clearance shown in FIG. 3. The arrangement shown in FIG. 3 can particularly advantageously be produced with extremely high precision from a one-piece metal block by means of a wire eroding machine. It is therefore particularly stable and free of wear.

Each of the two measuring rams 11, 12 shown in FIG. 3 has in each case just one contact tongue 16, 17 with just one associated contact surface 16a, 17a. The contact tongue 16, 17 is oriented essentially transversely to the longitudinal direction L and is elastically movable in the longitudinal direction L. An inner end of the contact tongue 16, 17 is free, while an opposite, outer end of the contact tongue 16, 17 is integrally joined to the solid body of the rest of the measuring ram 11, 12.

Each of the measuring rams 11, 12 has two parallel webs 51a, 51b; 52a, 52b located opposite one another and delimiting the associated clearance 21, 22. A respective first web 51a, 52a is spaced apart from the associated contact tongue 16, 17 via a respective first narrow gap 31, 32. The webs 51a, 51b, 52a, 52b run perpendicular to the longitudinal direction L, and they are elastically bendable in the longitudinal direction L. A respective second web 51b, 52b is provided parallel to the associated first web 51a, 52a and spaced apart therefrom via a respective clearance 21, 22. Each of the second webs 51b, 52b has a hole 61, 62, through which in each case one of the measuring sensors 71, 72 is passed. Each of the two cylindrical measuring sensors 71, 72 is connected in a positionally fixed manner at its end remote from the contact tongue 16, 17 to the solid body of the measuring ram 11, 12, while the actual sensor region of the measuring sensor 71, 72 is arranged within the associated clearance 21, 22 and is at a distance from the web surface remote from the contact tongue 16, 17 and is oriented towards said web surface. The sensor 71, 72 comprises an inductive measuring system which determines the distance between the sensor surface and the web surface to an accuracy of 0.4 μm.

The mode of operation of one of the measuring rams will be described on the basis of the left-hand measuring ram 11 in FIG. 3. The two webs 51a, 51b have in each case a first end and a second end. The first two ends are integrally connected via a spacer section 80 which is positionally fixed relative to the measuring leg, while the two second ends are formed integrally with a spacer section 81 which can move back and forth somewhat in the longitudinal direction. The contact tongue 16 and the movable spacer section 80 rigidly connected thereto are together connected elastically via the two parallel webs 51a, 51b to the positionally fixed spacer section 80 and thus to the solid body of the measuring leg 3.

When a pressure force of one end 110, 111, 112, 113 of a pipe section 100, 101, 102, 103 presses against the contact surface 16a of the left-hand contact tongue 16, the contact tongue 16 deforms a little into the measuring leg 3. Due to the integral formation of the entire structure, both the first and the second web 51a, 51b bend a little into the measuring leg, i.e. in the downward direction in FIG. 3. The deformation of the two webs 51a, 51b is in a certain ratio to the deformation of the contact tongue 16. The measuring sensor 71 is suitably calibrated and, based on the change in distance between the first web 51a and the measuring sensor 61, can precisely deduce the length of the measured pipe section 100, 101, 102, 103. The deformation movements of the components are illustrated by arrows.

The design of the measuring ram 11 according to the invention, in particular due to the two parallel webs 51a, 51b arranged perpendicular to the longitudinal direction L, allows the precise guidance both of the contact tongue 16 and of the movable spacer section 81 in the longitudinal direction L. Movements perpendicular to the longitudinal direction L, and also angular or rotational movements, do not take place or do not take place to a measurable extent.

Figure 4:
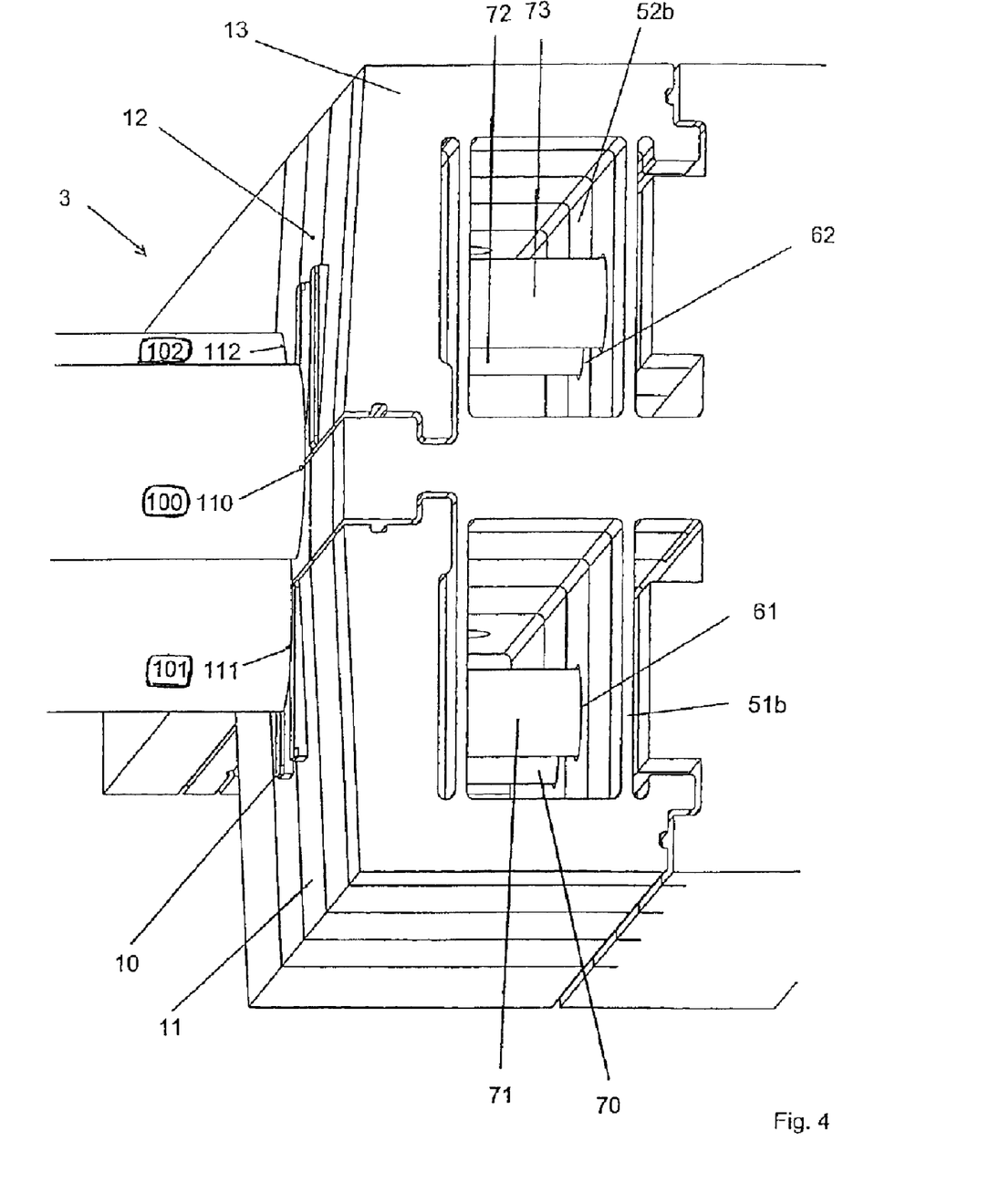
FIG. 4 shows a perspective view of the measuring leg with pipes to be measured.

FIG. 4 shows the plan view of the displaceable measuring leg 3 as seen in an angled perspective compared to FIG. 3. In addition, it is also possible to see in particular three of the four ends 110, 111, 112, 113 of the four pipe sections 100, 101, 102, 103 to be measured. The displaceable measuring leg 3 is not yet in contact with the four pipe section ends 110, 111, 112, 113. The respective second webs 51b, 52b in each case have a circular hole 61, 62, through which in each case one of the measuring sensors 71, 72 is passed. The measuring sensors 71, 72 are cylindrical and are connected fixedly to the measuring leg 3 at their end remote from the pipe. FIG. 4 clearly shows the one-piece design not just of the four measuring rams 10, 11, 12, 13 but rather also the one-piece design of the L-leg of the measuring leg 3 overall.

Figure 5:
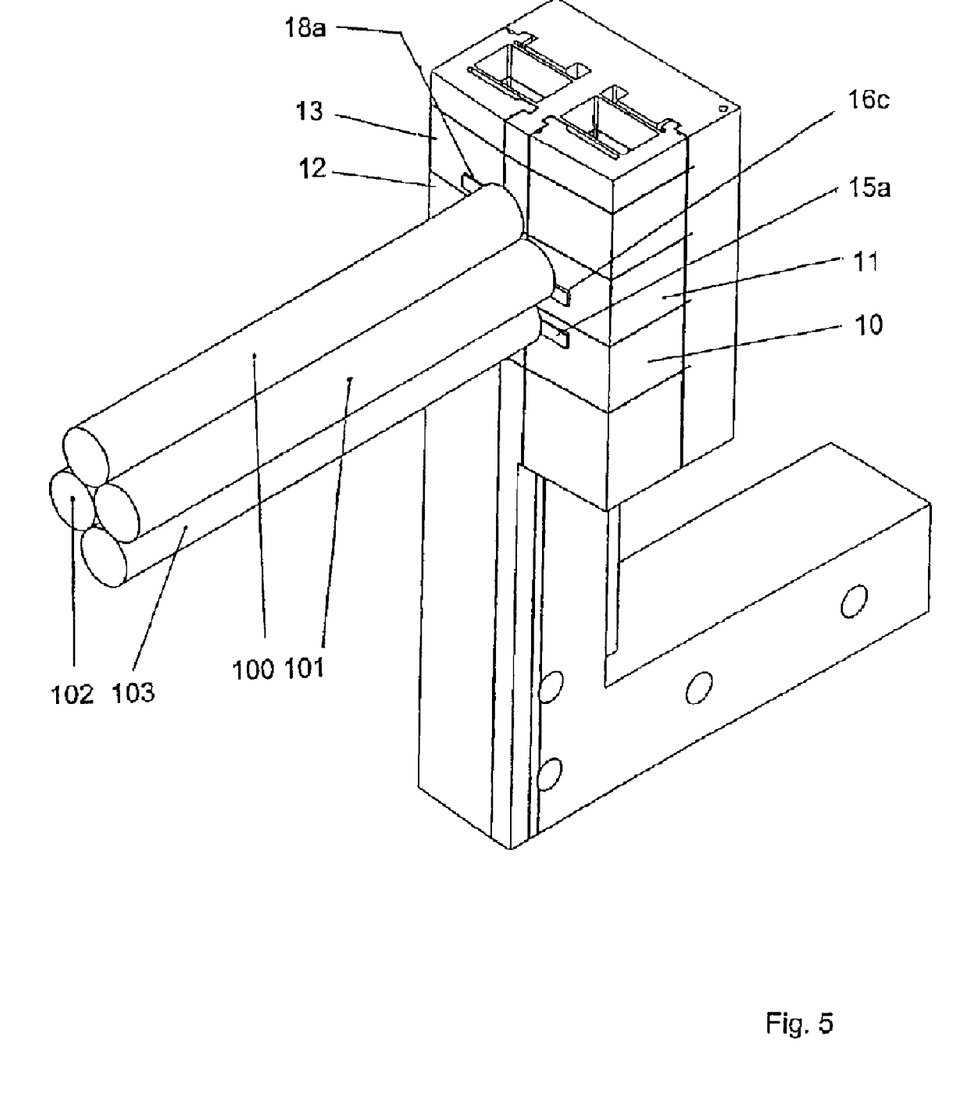
FIG. 5 shows a perspective view of the measuring leg with four pipe sections to be measured.

FIG. 5 shows the positioning of the four pipe sections 100, 101, 102, 103 to be measured on the measuring leg 3. It can be seen here that in each case just one measuring ram 10, 11, 12, 13 is assigned to each of the ends 110, 111, 112, 113 of the pipe sections 100, 101, 102, 103, and each pipe section 100, 101, 102, 103 comes into contact with just one of the bearing surfaces 15a, 16a, 17a, 18a. This ensures that the length of just one of the pipe sections 100, 101, 102, 103 can be measured by each measuring ram 10, 11, 12.

Figure 6:
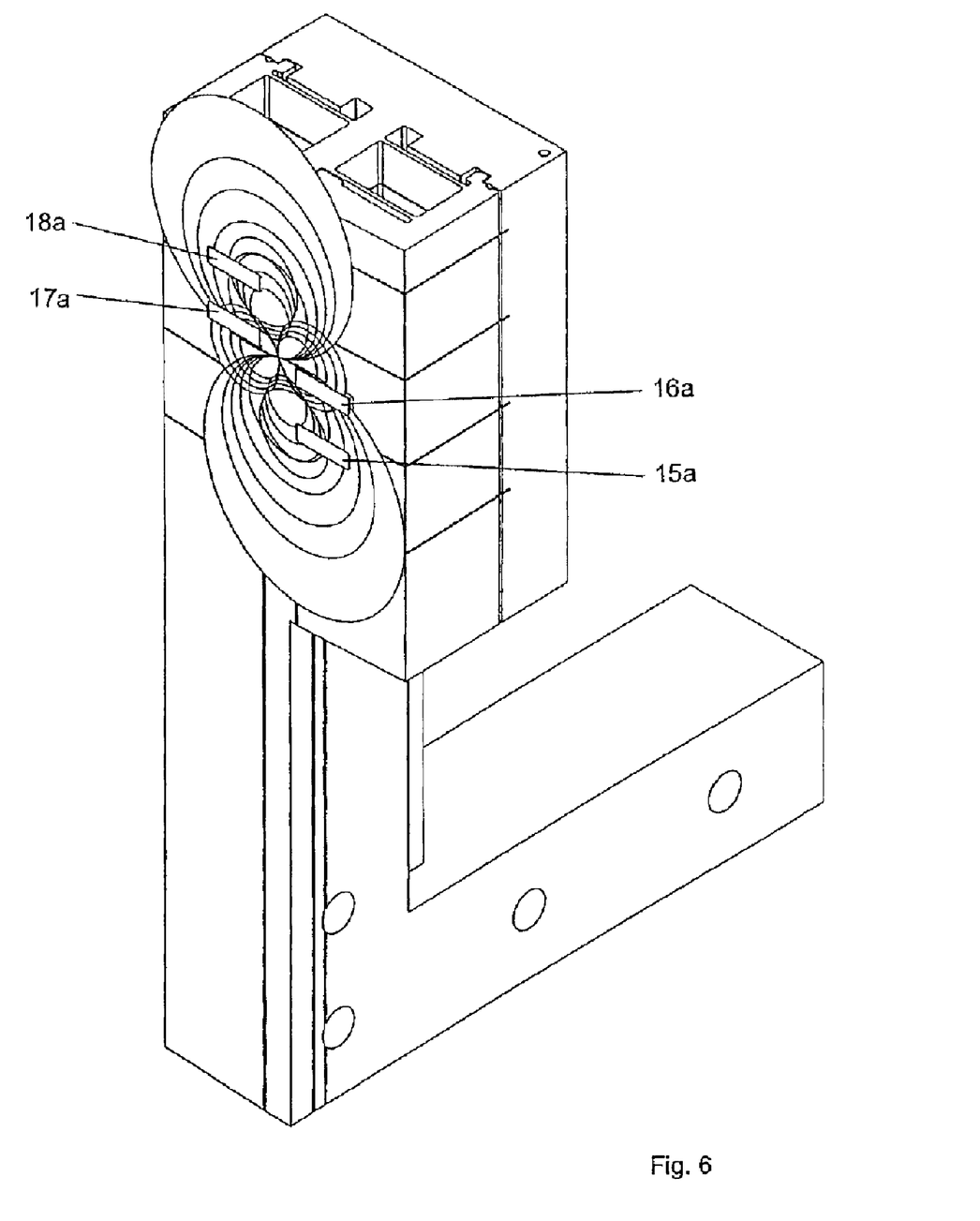
FIG. 6 shows a schematic view of the position of four or respectively two pipe sections to be measured simultaneously.

FIG. 6 shows a diagram of the position of the ends of four or respectively two pipe sections with different cross-sections that are to be measured simultaneously. The four bearing surfaces 15a, 16a, 17a, 18a are arranged as two vertically arranged pairs parallel to one another and offset vertically by the spacing of the two pairs. It is thus ensured that, in the case of four pipes to be measured simultaneously, each pipe end comes into contact with just one bearing surface 15a, 16a, 17a, 18a. In the case of two pipe sections to be measured simultaneously, the uppermost or lowermost measuring sensor of each of the two measuring sensor pairs in FIG. 6 is switched off and the measurement is carried out only via the two bearing surfaces 16a, 17a located opposite one another.

In addition, it should be noted that the arrangement according to the invention also allows the measurement of the length of just one pipe section. In this case, for example, all four measuring sensors 71, 72, 73, 74 can be switched off and the length measurement then takes place only via the distance meter which is assigned to the displaceable measuring leg 3.

LIST OF REFERENCES 2 measuring leg
3 measuring leg
10 measuring ram
11 measuring ram
12 measuring ram
13 measuring ram
15 contact tongue
15a bearing surface
16 contact tongue
16a bearing surface
17 contact tongue
17a bearing surface
18 contact tongue
18a bearing surface
21 clearance
22 clearance
31 gap
32 gap
41 gap 42 gap
51a web
51b web
52a web
52b web
61 hole
62 hole
70 sensor
71 sensor
72 sensor
73 sensor
80 spacer section
81 spacer section
82 spacer section
100 profile
101 profile
102 profile
103 profile
110 profile end
111 profile end
112 profile end
113 profile end
120 profile end
121 profile end
122 profile end
123 profile end
L longitudinal direction

The invention claimed is:

1. Measuring device for measuring the length of elongate profiles (100, 101, 102, 103) arranged in a longitudinal direction, in particular pipes, between at least two measuring legs (2, 3) located opposite one another, at least one of which can be displaced in the longitudinal direction (L) until the two ends (110, 111, 112, 113, 120, 121, 122, 123) of the elongate profile (100, 101, 102, 103) make contact with a respective measuring leg (2, 3), and at least one of the measuring legs (2, 3) has at least one measuring ram (10, 11, 12, 13) with in each case at least two webs (51a, 51b, 52a, 52b) which run transversely to the longitudinal direction (L) and which can be moved elastically back and forth in the longitudinal direction (L) at a distance from one another, each web having a first end and a second end, the first end of which is in each case connected to a spacer section (80) which is arranged in a positionally stable manner relative to a measuring leg (3) during the length measurement, and the second end of which is in each case connected to a spacer section (81, 82) which can be moved in the longitudinal direction (L) relative to a measuring leg (3) during the length measurement by means of a pressure force exerted by the elongate profiles (100, 101, 102, 102) on a rigidly connected contact tongue (15, 16, 17, 18), and comprising in each case a sensor (70, 71, 72, 73) which is assigned to the measuring ram (10, 11, 12, 13) and which measures the change in position of at least parts of the measuring ram (10, 11, 12, 13) brought about by the elastic deformation.

2. Measuring device according to claim 1, characterized in that the first ends of the first and second webs (51a, 52a) of the measuring rams (10, 11, 12, 13) are formed in one piece with the respective positionally fixed spacer section (80), and the second ends are formed in one piece with the respective movable spacer section (81).

3. Measuring device according to claim 1, characterized in that the contact tongues (15, 16, 17, 18) are connected in one piece with the respective movable spacer section (81), and the pressure force during the length measurement is transformed into a movement in the longitudinal direction (L).

4. Measuring device according to claim 1, characterized in that the first webs (51a) are in each case spaced apart from the respective contact tongue (16) via a first narrow gap (31), and the second webs (51b) are in each case spaced apart from the first webs (51a) by a clearance (21, 22), and the first webs (51a) are arranged between the contact tongues (16) and the second webs (51b) in the longitudinal direction (L).

5. Measuring device according to claim 4, characterized in that the measuring sensors (71, 72) are connected to the measuring leg (3) in a positionally fixed manner and are passed through a respective opening (61, 62) in the second webs (51b, 52b), and the sensor surfaces are arranged essentially free in the respective clearance (21, 22) and are oriented in each case towards a surface of the first webs (51a, 52a) remote from the contact tongue (15, 16, 17, 18).

6. Measuring device according to claim 1, characterized in that the displaceable measuring leg (3) is connected to a distance meter for measuring the displacement travel, and the distance meter and the at least one measuring sensor are connected to a data processing unit, by means of which the profile length can be determined.

7. Measuring device according to claim 1, characterized by a plurality of measuring rams (10, 11, 12, 13) which are all arranged on just one of the measuring legs (2, 3).

8. Measuring device according to claim 7, characterized in that the displaceable measuring leg (3) has two rows of measuring rams (10, 11, 12, 13) which are arranged next to one another and vertically offset from one another.

9. Measuring device according to claim 1, characterized by a switching device, by means of which a selected number of measuring sensors (71, 72) can be switched on.

* * * * *